Nov. 29, 1966    A. B. SMITH    3,287,845
EEL IMPALING DEVICE
Filed Sept. 14, 1964
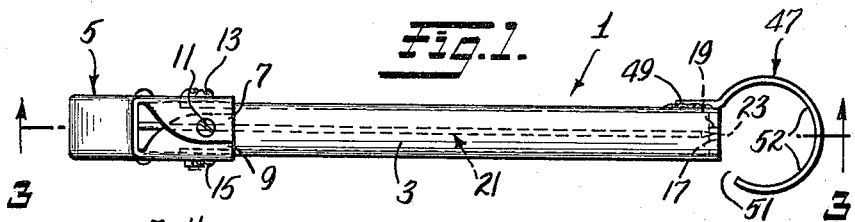
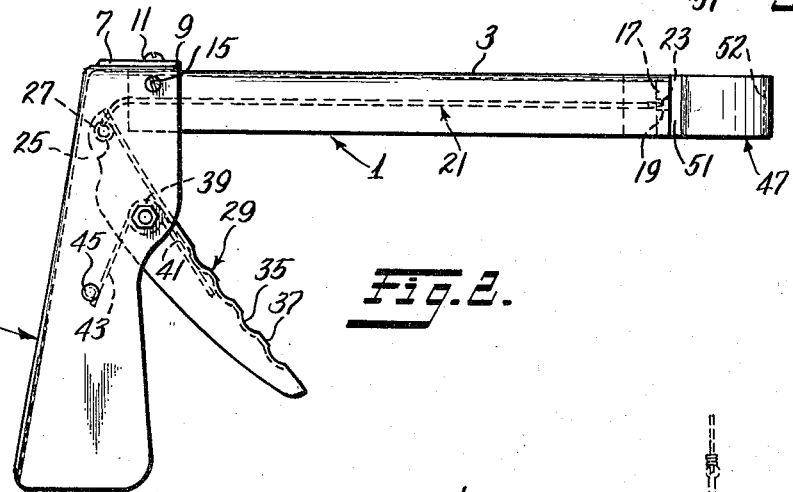
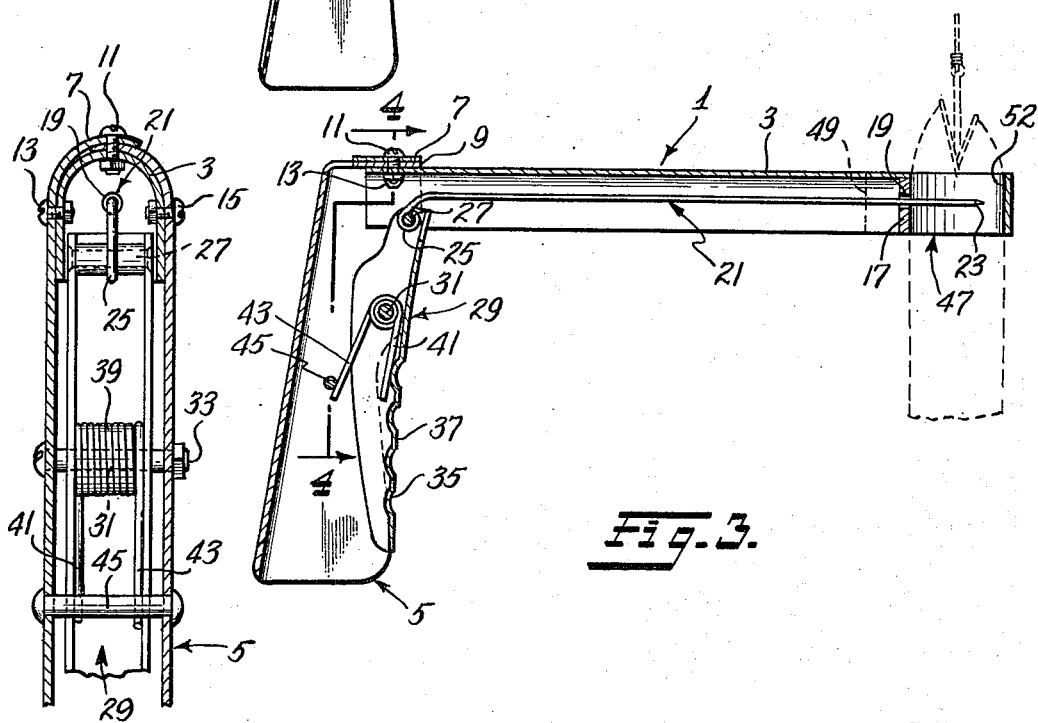
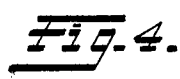
INVENTOR
*Anthony B. Smith*
BY *Bacon & Thomas*
ATTORNEYS

3,287,845
EEL IMPALING DEVICE
Anthony B. Smith, 21 Lincoln Place, Freehold, N.J.
Filed Sept. 14, 1964, Ser. No. 396,003
1 Claim. (Cl. 43—53.5)

This invention relates in general to a device for impaling eels and more particularly to a device for holding the head of an eel in position while impaling the same with a spear.

As is well-known among fishermen, many bodies of water are infested with eels, which frequently become ensnared on a fishing line, the eels are active and slippery and, therefore, are difficult to remove from the hook. During the difficult and unpleasant process of removal the line is often fouled by the wriggling of the eel and time is required to untangle it.

It is, therefore, a primary object of the present invention to provide a device whereby an eel, once caught on a fishing line, can be conveniently and quickly killed, and is thereafter firmly gripped while the hook is being removed.

Another object is to provide a convenient safe device for removing a fish hook from the mouth of an eel and disposing of the eel without the necessity of the fisherman's hands coming into contact with the body of the eel.

A more specific object is to provide a device for holding the eel's head firmly in position while impaling same.

Another object of the invention is to provide an eel-handling device which is simple in construction and operation, inexpensive to manufacture and sturdy and reliable in use.

Other objects and advantages will be apparent from the following description when read in conjunction with the accompanying drawings in which:

FIG. 1 is a top plan view of an eel-impaling device incorporating the principles of the present invention;

FIG. 2 is a side elevation of the device shown in FIG. 1;

FIG. 3 is a longitudinal cross-section taken on the line 3—3 of FIG. 1, the device being shown here in extended position with the subject eel being illustrated in dotted lines; and FIG. 4 is an enlarged fragmentary sectional view taken on the lines 4—4 of FIG. 3.

Referring now in more detail to the drawings, the device illustrated is generally indicated by the numeral 1 and formed generally in the shape of a pistol or the like. It comprises a barrel 3 formed of sheet metal or the like having a cross-sectional configuration of an inverted U-shape. The handle 5 of the device may also be formed of sheet metal or the like and again is generally U-shaped in configuration with its open side facing forwardly. The handle is attached in depending relation at the rear end of the barrel 3 and is provided with flanges 7 and 9 extending upwardly from either side thereof. Flanges 7 and 9 are folded inwardly, as best illustrated in FIG. 1, and fastened onto the top of the barrel 3, as by a nut-and-bolt connection 11. Similar nut-and-bolt connections 13, 15 may be employed to secure the side legs of handle 5 to the sides of the barrel 3.

A transverse plate 17 is secured as by welding or soldering at the forward end of the barrel, and is provided with a central opening 19. A spear 21, having a point 23 at its forward end, is positioned within the barrel with its forward end passing through opening 19. The spear 21 is thus mounted for guided longitudinal movement between a retracted position, at least substantially entirely within said barrel as shown in FIG. 2, and an extended position wherein the pointed end projects forwardly of said barrel, as shown in FIG. 3.

The rear end of the spear is turned downwardly and terminates in a loop 25 for pivotal attachment with respect to a connecting pin 27. Pin 27 is in turn mounted at the upper end of an actuating lever 29, the lever 29 being preferably also formed of sheet metal of rearwardly directed U-shaped configuration. The pin 27 is riveted or otherwise secured between the side legs of lever 29. Lever 29 is itself pivotally mounted on a pivot pin 31 formed by a shank of a nut-and-bolt assembly 33 extending transversely through the side legs of handle member 5. The lever 29 is narrower in configuration than the handle 5 and may thus be received in a generally telescopic manner therein. The lower end of lever 29 may be formed with finger indentations 35 to provide a gripping portion 37 and is pivotally movable thereby from an open position extending forwardly from the handle 5, as shown in FIG. 2, to a closed position disposed generally along the forward edge of handle 5, as shown in FIG. 3. Movement between these positions in turn actuates the spear element for longitudinal movement from the retracted position shown in FIG. 2 to the extended position shown in FIG. 3.

A coil spring 39 is mounted on the pin 31 between the side walls of lever 29. One end 41 of the spring member is extended downwardly to bear against the inner surface of gripping portion 37 and urge the lever 29 into open position. The other end 43 is extended downwardly at the rear of the spring assembly for engagement with a transverse strut 45 to resist rotational movement of the spring about the pin 31.

A supporting bracket 47 is secured at the forward end of the barrel 3 by means of a leg 49 extending rearwardly from one end thereof and affixed, as by welding, to the side of the barrel adjacent the forward extremity thereof. Bracket 47 is generally annular in configuration, defining a vertically accessible central area immediately in advance of the front end of the barrel. The other end of the bracket 47 terminates at a point spaced from the opposite side of the barrel 3 in order to provide a gap 51 for a purpose that will appear hereinafter. It should be particularly noted that the bracket 47 provides a bearing surface 52 in longitudinal alignment with the barrel 3 and in spaced opposed relation with respect to the forward end thereof.

In operation, when an eel has become ensnared on the line of a fisherman, a line is inserted into the area defined by a bracket 47 by merely passing it transversely through the gap 51. The line is then drawn upwardly until the head of the eel is drawn into a position substantially as illustrated in dotted lines in FIG. 3. At this point the lever 29 is actuated, projecting the spear element forward into the eel's head, the head being held stationary against the bearing surface 52. The puncturing action of the spear will kill the eel almost instantly, and, with the eel thus gripped and no longer moving, it is a relatively simple matter to remove the hook. Subsequently, the eel may be carried to any desired position and deposited into a fish bucket or bag, or over the side of the boat. By simply releasing the lever 29, the eel is freed and drops out of the bracket 47.

It will be understood that the single embodiment disclosed herein is presented by way of example rather than by way of limitation. The device, of course, may be used or adapted for use with other reptiles or fish, and numerous modifications may be made in the construction, assembly, materials and arrangement without departing from the spirit of the invention or the scope of the annexed claim.

I claim:

An eel-impaling device, comprising: an elongated barrel formed of sheet metal having a generally U-shaped cross-sectional configuration and having at the front end thereof a transverse guide plate with an opening centrally disposed therein; a spear positioned in said barrel with the forward end thereof slidably mounted in said opening for guided longitudinal movement between a retracted position at least substantially entirely within said barrel to an extended position wherein the forward end of said spear projects beyond the front end of said barrel, said forward end of said spear being provided with a point; a handle member secured below said barrel adjacent the rear end thereof, said handle member being formed of sheet metal of generally U-shaped configuration, open at the front thereof; a pivot pin mounted transversely between the opposite sides of said handle member in the upper portion thereof; a lever pivotally mounted intermediate its ends on said pivot pin and having its upper end pivotally connected to the rear end of said spear, the lower end of said lever extending below said pivot pin to provide a gripping portion movable between an open position diverging outwardly from within said handle and a closed position at least partially nested within said handle to thereby actuate said spear between its retracted and extended positions, respectively; spring means disposed between said handle and said gripping portion for urging said gripping portion into open position; and a bracket member fixed on one side of said barrel and having a generally annular portion extending forwardly therefrom to define with the front end of said barrel a substantially circular vertical, open area adapted to receive an eel head, said bracket having a free end terminating in closely spaced relation from the opposite side of said barrel to provide a narrow gap through which a fishing line may be introduced for drawing an eel into said open area and having a bearing surface positioned in longitudinal alignment with said barrel and in opposed spaced relation with respect to the front end thereof, whereby an eel may be held in position during the impaling action of said spear and gripped thereby while removing the hook.

References Cited by the Examiner
UNITED STATES PATENTS

| | | | |
|---|---|---|---|
| 554,764 | 2/1896 | Ackerson | 43—6 |
| 1,982,132 | 11/1934 | Boles | 43—5 |
| 2,155,913 | 4/1939 | Thompson et al. | 43—6 |
| 2,759,758 | 8/1956 | Yancey | 294—19 X |
| 3,183,031 | 5/1965 | Haberstick | 294—61 X |
| 3,208,786 | 9/1965 | Eddleman | 294—19 |

ALDRICH F. MEDBERY, *Acting Primary Examiner.*

SAMUEL KOREN, *Examiner.*

W. H. CAMP, *Assistant Examiner.*